US008582678B2

(12) United States Patent
Seo et al.

(10) Patent No.: US 8,582,678 B2
(45) Date of Patent: Nov. 12, 2013

(54) COMMUNICATION SYSTEM USING MULTI-USER MULTIPLE INPUT MULTIPLE OUTPUT (MU-MIMO) COMMUNICATION SCHEME

(75) Inventors: Bangwon Seo, Daejeon (KR); Young Jo Ko, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 949 days.

(21) Appl. No.: 12/636,203

(22) Filed: Dec. 11, 2009

(65) Prior Publication Data

US 2010/0150214 A1 Jun. 17, 2010

(30) Foreign Application Priority Data

Dec. 12, 2008 (KR) .......................... 10-2008-0126341
Nov. 30, 2009 (KR) .......................... 10-2009-0116554

(51) Int. Cl.
*H04B 7/02* (2006.01)
(52) U.S. Cl.
USPC .......................................................... 375/267
(58) Field of Classification Search
USPC .......................................................... 375/267
See application file for complete search history.

(56) References Cited

U.S. PATENT DOCUMENTS

| 2007/0223423 A1* | 9/2007 | Kim et al. ...................... 370/334 |
| 2008/0225960 A1 | 9/2008 | Kotecha et al. |
| 2010/0034146 A1* | 2/2010 | Hou et al. ...................... 370/328 |
| 2010/0142633 A1* | 6/2010 | Yu et al. ........................ 375/260 |
| 2011/0105164 A1* | 5/2011 | Lim et al. ...................... 455/501 |
| 2012/0314654 A1* | 12/2012 | Kotecha et al. ............... 370/328 |

FOREIGN PATENT DOCUMENTS

| EP | 1890413 A2 | 2/2008 |
| EP | 1895680 A2 | 3/2008 |
| WO | 2008/009157 A1 | 1/2008 |

OTHER PUBLICATIONS

Partial European Search Report for Application No. 09178827.3, 6 pages, dated Jul. 4, 2013.

* cited by examiner

*Primary Examiner* — Don N Vo
(74) *Attorney, Agent, or Firm* — Nelson Mullins Riley & Scarborough LLP

(57) ABSTRACT

A multi-user Multiple Input Multiple Output (MU-MIMO) communication scheme is provided for a terminal to select a precoding vector from column vectors included in a precoding matrix, and to feed back information associated with the selected precoding vector to a base station. The base station may transmit data to the terminal using the precoding vector.

14 Claims, 6 Drawing Sheets

FIG. 2

| | | NUMBER OF LAYERS | | | |
|---|---|---|---|---|---|
| | | 1 | 2 | 3 | 4 |
| P TYPE | | $P_1$ $P_2$ $P_3$ $P_4$ | $P_1$ $P_2$ $P_3$ $P_4$ | $P_1$ $P_2$ $P_3$ $P_4$ | $P_1$ $P_2$ $P_3$ $P_4$ |
| Q TYPE | | $Q_1$ $Q_2$ $Q_3$ $Q_4$ | $Q_1$ $Q_2$ $Q_3$ $Q_4$ | $Q_1$ $Q_2$ $Q_3$ $Q_4$ | $Q_1$ $Q_2$ $Q_3$ $Q_4$ |

FIG. 3

| | PRECODING MATRIX INDEX | P/Q TYPE IDENTIFIER | NUMBER OF LAYERS | PRECODING VECTOR |
|---|---|---|---|---|
| FIRST TERMINAL | $n_0$ | 0 | 1 | $P_1$ $P_2$ $P_3$ $P_4$ $Pn_0$ |
| SECOND TERMINAL | $n_1$ | 0 | 3 | $P_1$ $P_2$ $P_3$ $P_4$ $Pn_1$ |
| THIRD TERMINAL | $n_0$ | 1 | 2 | $P_1$ $P_2$ $P_3$ $P_4$ $Pn_0$ |
| FOURTH TERMINAL | $n_1$ | 1 | 2 | $P_1$ $P_2$ $P_3$ $P_4$ $Pn_1$ |
| FIFTH TERMINAL | $n_2$ | 0 | 1 | $P_1$ $P_2$ $P_3$ $P_4$ $Pn_2$ |

COMMUNICATION SYSTEM USING MULTI-USER MULTIPLE INPUT MULTIPLE OUTPUT (MU-MIMO) COMMUNICATION SCHEME

CROSS-REFERENCE TO RELATED APPLICATION

This application claims the benefit of Korean Patent Application No. 10-2008-0126341, filed on Dec. 12, 2008 and Korean Patent Application No. 10-2009-0116554, filed on Nov. 30, 2009 in the Korean Intellectual Property Office, the disclosure of which is incorporated herein by reference.

BACKGROUND

1. Field of the Invention

Embodiments of the present invention relate to a multi-user Multiple Input Multiple Output (MU-MIMO) communication scheme.

2. Description of the Related Art

A wireless communication system uses a multi-antenna Multiple Input Multiple Output (MIMO) communication scheme to enhance a frequency efficiency of radio resources. For example, the multi-antenna MIMO communication scheme may use a codebook-based multi-antenna MIMO communication scheme.

In the codebook-based multi-antenna MIMO communication, a terminal may select, as a precoding vector, at least one column vector from a plurality of column vectors included in a precoding matrix, and may feed back information associated with the selected precoding vector to a base station. The base station may have the same codebook as a codebook of the terminal. The base station may identify the precoding vector selected by the terminal, based on the fed back information associated with the precoding vector. The base station may transmit data to the terminal using the identified precoding vector.

A particular precoding vector may concentrate transmission energy in a particular direction. Accordingly, when different terminals receive data using the same precoding vector, a data transmission performance may be deteriorated due to interference between the terminals.

The base station may need to select only a single terminal from a plurality of terminals having selected the same column vector as the precoding vector, and to transmit data to the selected terminal.

Accordingly, each of the terminals may select a different column vector as the precoding vector to enhance the data transmission performance.

SUMMARY

An aspect of the present invention provides a multi-user Multiple Input Multiple Output (MU-MIMO) communication scheme that may effectively transmit data to a plurality of users at the same time using the same time resource or frequency resource in a MIMO communication system.

According to an aspect of the present invention, there is provided a terminal including: a channel estimator to estimate a channel status of a channel formed between the terminal and a base station; a precoding vector selector to select a precoding vector from column vectors included in a precoding matrix based on the channel status; a feedback information generator; and a transmitter. When the precoding vector selector selects consecutive column vectors as precoding vectors, the feedback information generator may select, as a reference vector, a column vector that is located at an outermost location among the precoding vectors and may generate, as feedback information, information associated with the reference vector and a number of the selected column vectors. The transmitter may transmit the feedback information to the base station.

According to another aspect of the present invention, there is provided a base station including: a receiver to receive feedback information from each of terminals included in the base station; a precoding vector identifier to identify a precoding vector selected by each of the terminals, based on the feedback information; a terminal selector to select, as a data reception terminal, terminals where the selected precoding vectors do not overlap; and a transmitter to transmit data to the data receive terminal.

According to still another aspect of the present invention, there is provided a terminal including: a channel estimator to estimate a channel status of a channel formed between the terminal and a base station; a precoding vector selector to select, from column vectors included in a precoding matrix, at least one consecutive column vector including a first column vector or a last column vector as a precoding vector, based on the channel status; a transmitter to transmit information associated with the precoding vector to the base station; and a receiver to receive data from the base station based on the precoding vector.

EFFECT

According to embodiments of the present invention, it is possible to effectively transmit data to a plurality of users at the same time using the same time resource or frequency resource in a Multi-user Multiple Input Multiple Output (MU-MIMO) communication system.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a diagram illustrating a precoding matrix and a reference vector according to an embodiment of the present invention;

FIG. 3 is a diagram illustrating a concept of selecting, from a plurality of terminals, a terminal to receive data according to an embodiment of the present invention;

DETAILED DESCRIPTION

Figure 1:
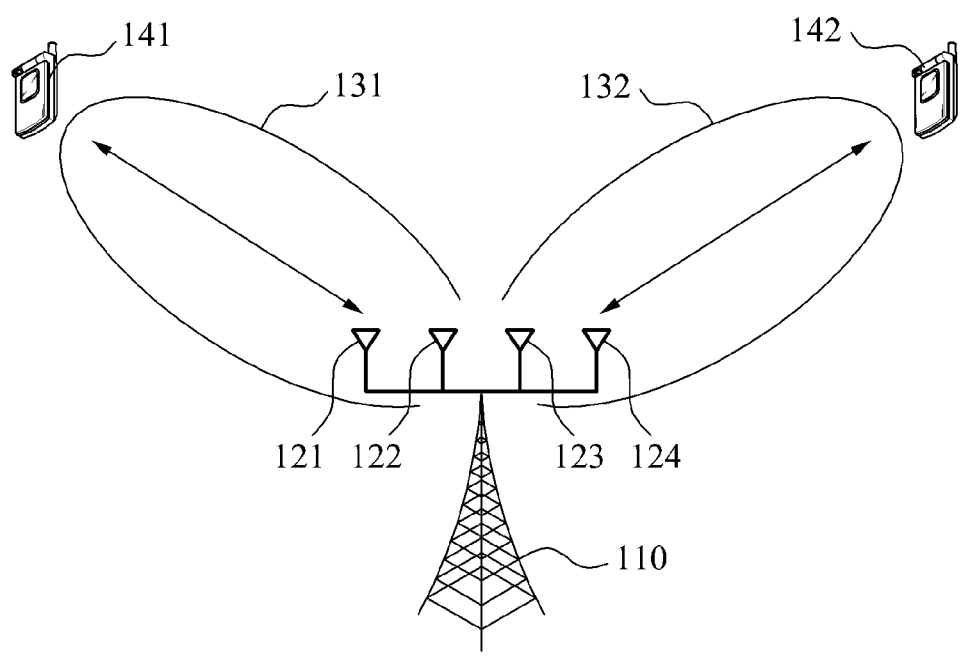
FIG. 1 is a diagram illustrating a concept of a Multi-user Multiple Input Multiple Output (MU-MIMO) communication system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a concept of a Multi-user Multiple Input Multiple Output (MU-MIMO) communication system according to an embodiment of the present invention.

A base station 110 may transmit data to terminals 141 and 142 or receive data from the terminals 141 and 142 using a plurality of antennas 121, 122, 123, and 124. The base station 110 may concentrate on transmitting or receiving the data into a particular direction using the plurality of antennas 121, 122, 123, and 124, and a precoding vector. Since an effect of interference against other directions decreases, a data rate at the base station 110 may be enhanced.

In FIG. 1, the terminals 141 and 142 are positioned at different directions. The base station 110 may generate different beams 131 and 132 using different precoding vectors with respect to the terminals 141 and 142, respectively. The base station 110 may transmit the data to the terminals 141 and 142 using the generated beams 131 and 132, respectively.

The terminals 141 and 142 may have the same codebook. The codebook may include a plurality of precoding matrices. Each of the precoding matrices may include a plurality of precoding vectors. A precoding vector may be selected based on a channel status of a channel formed between the base station 110 and each of the terminals 141 and 142. When the base station 110 transmits data to each of the terminals 141 and 142 using the selected precoding vector, channel quality information may be generated. Each of the terminals 141 and 142 may transmit, to the base station 110, the channel quality information and information associated with the precoding vector. Information associated with the precoding vector may include information associated with an index and a rank of the precoding matrix including the precoding vector.

The base station 110 may receive, from each of the terminals 141 and 142, the channel quality information and information associated with the precoding vector. When the terminals 141 and 142 select different precoding vectors, the base station 110 may transmit data to the terminals 141 and 142 using the precoding vectors selected by the terminals 141 and 142, respectively. When the terminals 141 and 142 select the same precoding vector, the base station 110 may compare channel quality information of the terminal 141 with channel quality information of the terminal 142. The base station 110 may transmit data to a terminal having relatively excellent channel quality information.

According to an embodiment of the present invention, a base station and a terminal may have the same codebook. The codebook may include at least one precoding matrix.

The codebook S may be expressed by the following Equation 1:

$$|S=\{W_n, n=1, 2, \ldots, N\},$$ [Equation 1]

where $W_n$ denotes an $n^{th}$ precoding matrix constituting the codebook.

The $n^{th}$ precoding matrix $W_n$ may be expressed by the following Equation 2:

$$|W_n=[w_{n,1}, w_{n,2}, \ldots, w_{n,L}], n=1, 2, \ldots, N|,$$ [Equation 2]

where $w_{n,l}$ denotes an $l^{th}$ column vector of the $n^{th}$ precoding matrix $W_n$ and $l=1, 2, \ldots, L$.

A layer indicates a number of data symbols transmitted from the base station to a single terminal using a plurality of transmit antennas. When the terminal selects a plurality of precoding vectors, the terminal may feed back, to the base station, information associated with the selected precoding vectors. The base station may simultaneously transmit the plurality of data symbols to the terminal using a layer corresponding to each of the precoding vectors.

When it is assumed that a number of layers transmitted from the base station to the single terminal is M, and $1_1{}^{th}, 1_2{}^{th}, \ldots, 1_M{}^{th}$ column vectors of the $n^{th}$ precoding matrix $W_n$ are used, a precoding matrix to be used may be defined as given by the following Equation 3:

$$W_n{}^{(l_1,l_2,\ldots,l_M)}=[w_{n,l_1}, w_{n,l_2}, \ldots, w_{n,l_M}]$$ [Equation 3]

When it is assumed that the base station selects a precoding vector using the $n^{th}$ precoding matrix $W_n$ with respect to a first terminal, and the first terminal selects, as the precoding vector, a first column vector of $W_n$ when the number of layers is "1", the first terminal selects, as the precoding vectors, the first column vector and a fourth column vector of $W_n$ when the number of layers is "2", the first terminal selects, as the precoding vectors, the first column vector, a second column vector, and the fourth column vector of $W_n$ when the number of layers is "3", and the first terminal selects, as the precoding vectors, the first column vector, the second column vector, a third column vector, and the fourth column vector of $W_n$ when the number of layers is "4", the following Equation 4 may be used:

$$W_n{}^{(1)}, W_n{}^{(1,4)}, W_n{}^{(1,2,4)}, W_n{}^{(1,2,3,4)}.$$ [Equation 4]

When $x_M=[x_1, x_2, \ldots, x_M]$ indicates a data vector that the base station desires to transmit and in this instance, precoding matrix information to be used is $W_n{}^{(l_1, l_2, \ldots, l_M)}$, the base station may transmit $W_n{}^{(l_1, l_2, \ldots, l_M)} x_M$.

When the base station uses column vectors of the $n^{th}$ precoding matrix $W_n$ in an order of $l_1, l_2, \ldots, l_L$, a precoding matrix $P_n$ may be defined by the following Equation 5:

$$P_n \triangleq [w_{n,l_1}, w_{n,l_2}, \ldots, w_{n,l_L}] = [p_{n,1}, p_{n,2}, \ldots, p_{n,L}].$$ [Equation 5]

Specifically, when the base station uses the column vectors of $W_n$ in the order of the above Equation 4, the precoding matrix $P_n$ may be expressed by the following Equation 6:

$$P_n=[w_{n,1}, w_{n,4}, w_{n,2}, w_{n,3}].$$ [Equation 6]

Here, it is assumed that the first terminal selects the precoding vector based on the precoding matrix $P_n$ of the above Equation 6. The first terminal may sequentially select the precoding vector from left column vectors. For example, when the first terminal selects a single precoding vector, the first terminal may select $w_{n,1}$. When the first terminal selects two precoding vectors, the first terminal may sequentially select $w_{n,1}$ and $w_{n,4}$. When the first terminal selects three precoding vectors, the first terminal may sequentially select $w_{n,1}$, $w_{n,4}$, and $w_{n,2}$. When the first terminal selects four precoding vectors, the first terminal may sequentially select $w_{n,1}$, $w_{n,4}$, $w_{n,2}$, and $w_{n,3}$.

A second terminal may select the precoding vector based on a precoding matrix $Q_n$ that is generated by changing orders of column vectors included in the precoding matrix $P_n$. The second terminal may select the precoding vector based on the precoding matrix $Q_n$ as given by the following Equation 7:

$$Q_n[P_{n,L} P_{n,L-1} \ldots P_{n,1}]$$ [Equation 7]

$Q_n$ of the above Equation 7 may be constructed by arranging the column vectors of $P_n$ in an inverse order of $P_n$.

Here, it is assumed that the second terminal selects the precoding vector based on the precoding matrix $Q_n$ of the above Equation 7. The second terminal may sequentially select the precoding vector from left column vectors. For example, when the second terminal selects a single precoding vector, the second terminal may select $w_{n,3}$. When the second terminal selects two precoding vectors, the second terminal may sequentially select $w_{n,3}$ and $w_{n,2}$. When the second terminal selects three precoding vectors, the second terminal may sequentially select $w_{n,3}$, $w_{n,2}$, and $w_{n,4}$. When the second terminal selects four precoding vectors, the second terminal may sequentially select $w_{n,3}$, $w_{n,2}$, $w_{n,4}$, and $w_{n,1}$.

Here, it is assumed that each of the first terminal and the second terminal selects two precoding vectors. The first terminal may select $w_{n,1}$ and $w_{n,4}$ as precoding vectors, and receive data from the base station using the selected precoding vectors $w_{n,1}$ and $w_{n,4}$. The second terminal may select $w_{n,3}$ and $w_{n,2}$ as precoding vectors, and receive data from the base station using the selected precoding vectors $w_{n,3}$ and $w_{n,2}$. Accordingly, it is possible to maximally prevent each of the first terminal and the second terminal from selecting the same precoding vector, and to thereby enhance a data rate.

FIG. 2 is a diagram illustrating a precoding matrix and a reference vector according to an embodiment of the present invention. Here, it is assumed that a codebook includes only a single precoding matrix for ease of description.

A first terminal may select at least one precoding vector from a plurality of column vectors included in the precoding matrix. Here, the first terminal is assumed to select a column vector $w_1$ as the precoding matrix. The first terminal may generate feedback information that includes a location or an index of the precoding vector $w_1$ in the precoding matrix.

For example, the first terminal may assume a matrix P that includes column vectors having the same orders as orders of the column vectors included in the precoding matrix. The matrix P may be the same matrix as the precoding matrix. In this case, the feedback information may include information regarding that the first terminal utilizes the matrix P, and that the precoding vector corresponds to a first vector of the matrix P. The base station may be aware that the precoding vector corresponds to the first vector of the matrix P based on the feedback information.

Here, the first terminal is assumed to select two precoding vectors. The first terminal may select two consecutive column vectors $w_2$ and $w_3$ as the precoding vectors. In this case, the feedback information may include information regarding that the first terminal utilizes the matrix P, and that the precoding vectors correspond to a second vector and a third vector of the matrix P. The base station may be aware that the precoding vectors correspond to the second vector and the third vector of the matrix P based on the feedback information.

To simply generate the feedback information, the first terminal may select a reference vector from the plurality of precoding vectors and generate, as the feedback information, information associated with a number of precoding vectors. For example, when the first terminal selects the column vectors $w_2$ and $w_3$ as the precoding vectors, the first terminal may generate, as the feedback information, information regarding that the second column vector of the matrix P, that is, $w_2$ corresponds to the reference vector, that the number of precoding vectors is "2", and that the column vectors located to the right of the reference vector, including the reference vector, are selected as the precoding vectors. The base station may be aware that $w_3$ located to the right of $w_2$ corresponding to the reference vector is also selected as the precoding vector.

When the first terminal utilizes the matrix P, the first terminal may select, as the reference vector, a left-most column vector among the consecutive column vectors. In this case, information regarding that the first terminal utilizes the matrix P and that the column vectors located to the right of the reference vector, including the reference vector, are selected as the precoding vectors may be the same as the above information.

Orders of the column vectors of the matrix P may be determined based on an order of each of the column vectors selected as the precoding vector.

For example, when the first terminal selects a single precoding vector, the first terminal may select, as the precoding vector, $w_1$ that is located furthest to the left of the precoding matrix. When the first terminal selects two precoding vectors, the first terminal may select, as the precoding vectors, $w_1$ and $w_2$ that are located to the left of the precoding matrix. When the first terminal selects a plurality of precoding vectors, the selected precoding vectors may need to be consecutively located.

In this case, the first terminal may simply construct the feedback information by fixing the reference vector to $w_1$. Specifically, information regarding that the first terminal selects the precoding vector using the matrix P, and that $w_1$, which is the first column vector of the matrix P, corresponds to the reference vector may be the same as the above information.

Accordingly, the first terminal may simply construct the feedback information by including, in the feedback information, only information regarding that the first terminal selects the precoding vector using the matrix P, and that the number of precoding vectors is "2". The number of selected precoding vectors may be referred to as rank information.

It is described above that the first terminal selects, as the reference vector, a left-most column vector among consecutive column vectors. However, it is only an example and thus the first terminal may select, as the reference vector, a right-most column vector among the consecutive column vectors.

In FIG. 2, a matrix Q may include column vectors having the same orders as orders of the column vectors included in the precoding matrix. Specifically, the matrix Q may be the same as the matrix P. However, when the second terminal selects the precoding vector using the matrix Q, the reference vector may be a right-most column vector among the plurality of column vectors included in the matrix Q. When the second terminal selects the plurality of precoding vectors, column vectors that are located furthest to the left of the reference vector, including the reference vector, may be selected as the precoding vectors.

For example, when the second terminal selects only a single precoding vector, $w_4$ that is located furthest to the right of the matrix Q may be selected as the precoding vector. When the second terminal selects two precoding vectors, $w_3$ and $w_4$ may be selected as the precoding vectors.

FIG. 3 is a diagram illustrating a concept of selecting, from a plurality of terminals, a terminal to receive data according to an embodiment of the present invention. Here, it is assumed that a codebook includes a plurality of precoding matrices. In this case, each terminal may need to include, in feedback information, a precoding matrix index (PMI) of a precoding matrix that includes a precoding vector selected by each terminal, among the plurality of precoding matrices included in the codebook.

Referring to FIG. 3, a first row shows items, and a second row shows feedback information associated with a first terminal. Referring to feedback information associated with the first terminal, a precoding vector selected by the first terminal may be included in an $n_0^{th}$ precoding matrix among the plurality of precoding matrices. When the first terminal selects the precoding vector using a matrix P, a P/Q type identifier may be "0". In this case, a reference vector may be a left-most column vector among a plurality of column vectors included in the matrix P. Since a number of layers is "1", the base station may be aware that the first terminal selects a single precoding vector. Accordingly, the base station may be aware that the first terminal selects, as the precoding vector, a first column vector of the $n_0^{th}$ precoding matrix.

A third row shows feedback information associated with a second terminal. Referring to feedback information associated with the second terminal, the base station may be aware that the second terminal selects, as precoding vectors, a first column vector, a second column vector, and a third column vector of an $n_1^{th}$ precoding matrix.

When a third terminal selects the precoding vector using a matrix Q, the P/Q type identifier may be "1". In this case, the reference vector may be a right-most column vector among the plurality of column vectors included in the matrix Q. Since the number of layers is "2", the base station may be aware that the third terminal selects, as the precoding vectors, a third column vector and a fourth column vector of the $n_0^{th}$ precoding matrix.

A fifth row shows feedback information associated with a fourth terminal. Referring to feedback information associated with the fourth terminal, the base station may be aware that the fourth terminal selects, as the precoding vectors, the third column vector and a fourth column vector of the $n_1^{th}$ precoding matrix.

Also, referring to feedback information associated with the fourth terminal, the base station may be aware that the fourth terminal selects, as the precoding vector, a first column vector of an $n_2^{th}$ precoding matrix.

Referring to feedback information associated with each terminal, it can be known that the first terminal and the third terminal select the precoding vector from the column vectors included in the $n_0^{th}$ precoding matrix. More specifically, the first terminal selects, as the precoding vector, the first column vector of the $n_0^{th}$ precoding matrix. The third terminal selects, as the precoding vectors, the third column vector and the fourth column vector of the $n_0^{th}$ precoding matrix. The precoding vectors selected by the first terminal and the third terminal do not overlap. In this case, the base station may transmit data to the first terminal and the third terminal using the selected corresponding precoding vectors.

Referring to feedback information associated with the second terminal and the fourth terminal, it can be known that the second terminal and the fourth terminal select the precoding vectors from the column vectors included in the $n_1^{th}$ precoding matrix. More specifically, the second terminal selects, as the precoding vectors, the first column vector, the second column vector, and the third column vector of the $n_1^{th}$ precoding matrix. The fourth terminal selects, as the precoding vectors, the third vector and the fourth column vector of the $n_1^{th}$ precoding matrix. The precoding vectors selected by the second terminal and the fourth terminal overlap. In this case, the base station may select only one terminal from the second terminal and the fourth terminal, and may transmit data to the selected terminal using the third column vector as the precoding vector.

According to an embodiment of the present invention, each terminal may transmit feedback information to a base station by including, in the feedback information, channel quality information associated with each precoding vector. The base station may determine a terminal to receive data using a corresponding precoding vector, based on the channel quality information.

The channel quality information may be, for example, a signal-to-noise ratio (SNR) when each terminal receives data using a corresponding precoding vector. The base station may compare SNRs in a case where each terminal receives data using a particular column vector, and may select, as the terminal to receive the data, a terminal having a most excellent SNR using the corresponding particular column vector.

Figure 4:
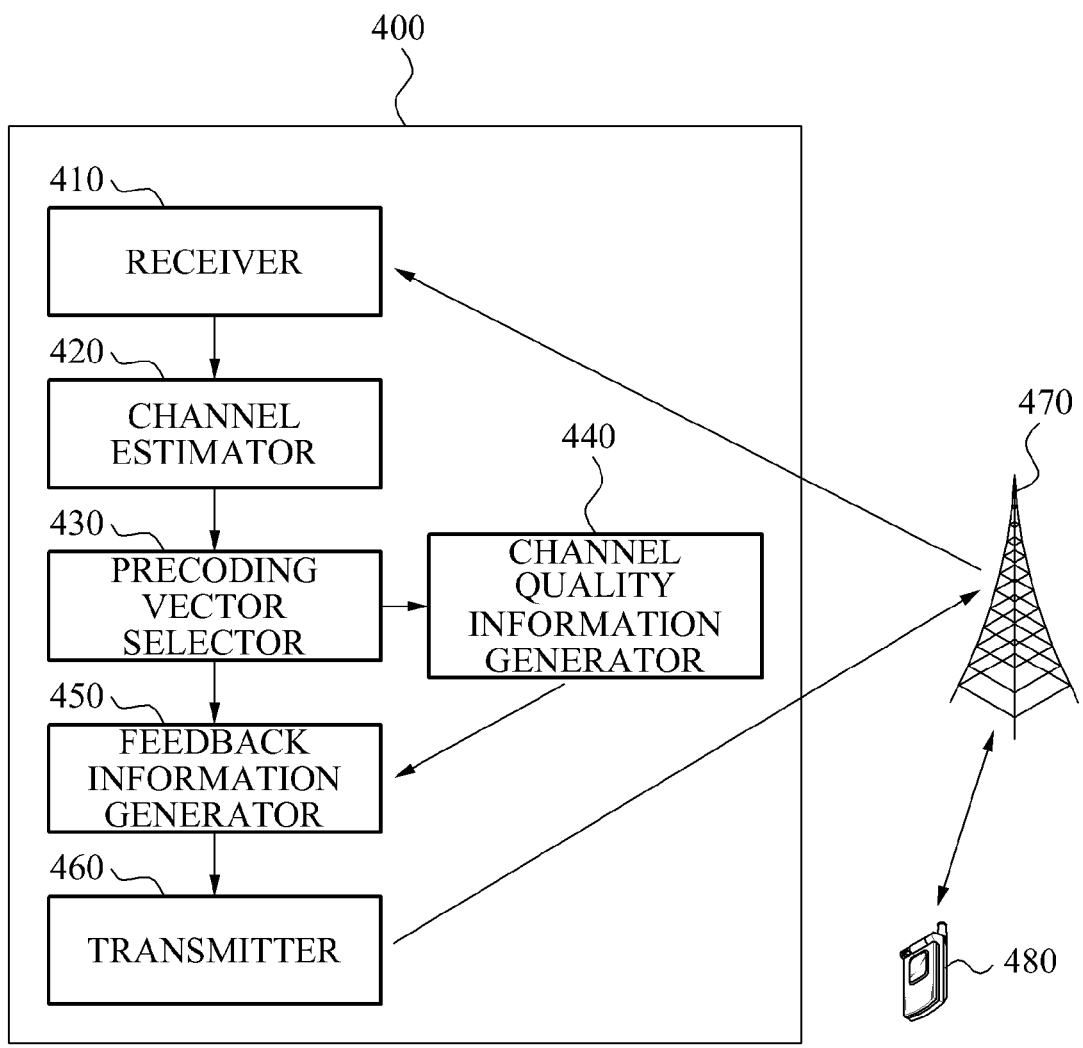
FIG. 4 is a block diagram illustrating a configuration of a terminal according to an embodiment of the present invention.

FIG. 4 is a block diagram illustrating a configuration of a terminal 400 according to an embodiment of the present invention. The terminal 400 may include a receiver 410, a channel estimator 420, a precoding vector selector 430, a channel quality information generator 440, a feedback information generator 450, and a transmitter 460.

The channel estimator 420 may estimate a channel status of a channel formed between the terminal 400 and a base station 470.

The receiver 410 may receive a pilot signal from the base station 470, and estimate the channel status based on the pilot signal.

The precoding vector selector 430 may select a precoding vector based on the estimated channel status. The precoding vector selector 430 may select the precoding vector from a plurality of column vectors included in a precoding matrix, based on the estimated channel status.

The feedback information generator 450 may generate, as feedback information, information associated with the precoding vector. The precoding vector selector 430 may select, as precoding vectors, consecutive column vectors from the plurality of column vectors included in the precoding matrix. In this case, the feedback information generator 450 may select, as a reference vector, a column vector that is located at an outermost location among the selected precoding vectors, and may generate, as the feedback information, information associated with the reference vector and information associated with a number of the column vectors selected as the precoding vector.

Information associated with the reference vector may include information associated with an index of the reference vector. The index of the reference vector indicates which column vector is selected as the reference vector from the plurality of column vectors included in the precoding matrix. When a left-most or right-most column vector among the consecutive column vectors is selected as the reference vector, the feedback information may be easily generated.

The channel quality information generator 440 may generate channel quality information between the terminal 400 and the base station 470 based on the selected precoding vector. The channel quality information generator 440 may generate, as the channel quality information, information associated with an SNR in a case where data is received from the base station 470 using the precoding vector selected by the precoding vector selector 430. The feedback information generator 450 may include the channel quality information in the feedback information.

The transmitter 460 may transmit the feedback information to the base station 470.

The base station 470 may receive feedback information from each of terminals 400 and 480. The base station 470 may identify a precoding vector selected by each of the terminals 400 and 480, based on the feedback information. The base station 470 may transmit data to each of the terminals 400 and 480 using the corresponding selected precoding vector.

The receiver 410 may receive data from the base station 470 based on the feedback information.

When the terminals 400 and 480 select the same column vector as the precoding vector, the base station 470 may select any one of the terminals 400 and 480 as a terminal to receive data, and may transmit the data to the selected terminal using the precoding vector. The base station 470 may select the terminal to receive the data, based on the channel quality information transmitted by each of the terminals 400 and 480.

Figure 5:
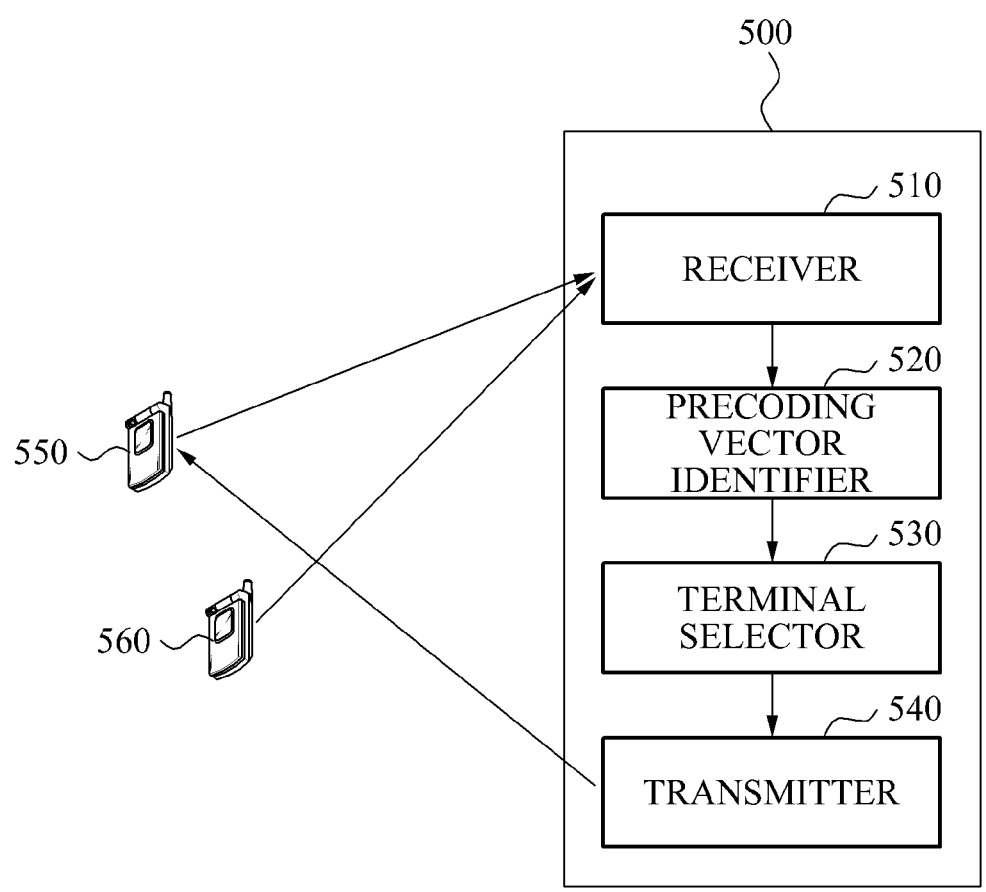
FIG. 5 is a block diagram illustrating a configuration of a base station according to an embodiment of the present invention.

FIG. 5 is a block diagram illustrating a configuration of a base station 500 according to an embodiment of the present invention. The base station 500 may include a receiver 510, a precoding vector identifier 520, a terminal selector 530, and a transmitter 540.

The receiver 510 may receive feedback information from each of terminals 550 and 560 included in the base station 500.

The precoding vector selector 520 may identify a precoding vector selected by each of the terminals 550 and 560, based on the feedback information. The selected precoding vectors may be consecutive column vectors among column vectors included in a precoding matrix. In this case, feedback information may include information associated with a reference vector that is located at an outermost location among the precoding vectors, and information associated with a number of column vectors selected as the precoding vectors.

Information associated with the reference vector may include information associated with a location of the reference vector in the precoding matrix, and information associated with a location of the reference vector among the column vectors selected as the precoding vectors.

For example, the index of the reference vector may be used as information associated with the location of the reference vector. Information associated with a left-most or right-most column vector among the selected consecutive column vectors may be used as information associated with the location of the reference vector among the column vectors selected as the precoding vectors.

The terminal selector 530 may select, as terminals to receive data, terminals where the selected precoding vectors do not overlap. For example, when each of the terminals 550 and 560 selects, as the precoding vector, a column vector included in a different precoding matrix, the terminal selector 530 may select both of the terminals 550 and 560 as the terminals to receive data.

When each of the terminals 550 and 560 selects, as the precoding vector, a column vector included in the same precoding matrix, and in this instance, indexes of the selected precoding vectors are different, it indicates that each of the terminals 550 and 560 selects the different precoding vector. In this case, the terminal 530 may select both of the terminals 550 and 560 as the terminals to receive data.

However, when the terminals 550 and 560 select, as the precoding vector, the same column vector included in the same precoding matrix, the terminal selector 530 may select any one of the terminals 550 and 560 as the terminal to receive data.

The receiver 510 may receive, from each of the terminals 550 and 560, channel quality information associated with the precoding vector selected by each of the terminals 550 and 560. The terminal selector 530 may select the terminal to receive data based on the channel quality information.

The channel quality information may be, for example, information associated with an SNR in a case where each of the terminals 550 and 560 receives data using the corresponding precoding vector. The terminal selector 530 may compare the SNRs in a case where the terminals 550 and 560 receive the data using the corresponding precoding vector, and may select a terminal having a most excellent SNR as the terminal to receive the data.

The transmitter 540 may transmit data to the selected terminal. The transmitter 540 may transmit the data using the precoding vector selected by the selected terminal.

Figure 6:
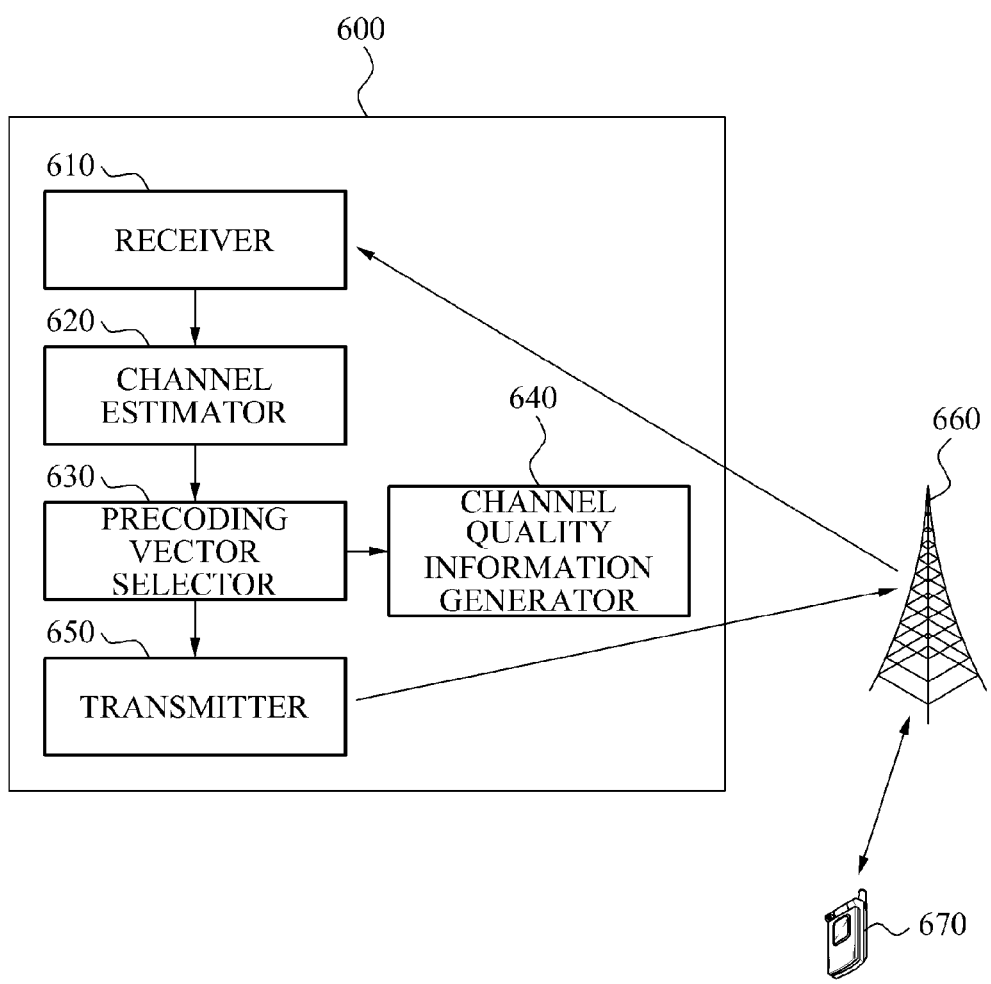
FIG. 6 is a block diagram illustrating a configuration of a terminal according to another embodiment of the present invention.

FIG. 6 is a block diagram illustrating a configuration of a terminal 600 according to another embodiment of the present invention. The terminal 600 may include a receiver 610, a channel estimator 620, a precoding vector selector 630, a channel quality information generator 640, and a transmitter 650.

The channel estimator 620 may estimate a channel status of a channel formed between the terminal 600 and a base station 660. The receiver 610 may receive a pilot signal from the base station 660. The channel estimator 620 may estimate the channel status based on the pilot signal.

The precoding vector selector 630 may select at least one precoding vector from column vectors included in a precoding matrix. The precoding vector selector 630 may select consecutive column vectors as precoding vectors. In this case, the precoding vector selector 630 may select, as the precoding vectors, column vectors that include a first column vector or a last column vector among the column vectors included in the precoding matrix. The first column vector indicates a left-most column vector among the column vectors included in the precoding matrix. The last column vector indicates a right-most column vector among the column vectors included in the precoding matrix.

The channel quality information generator 640 may generate channel quality information associated with the selected precoding vector. The channel quality information may be, for example, information associated with an SNR in a case where each of terminals 600 and 670 receives data using the selected precoding vector.

The transmitter 650 may transmit information associated with the precoding vector to the base station 660.

The base station 660 may identify the precoding vector selected by the terminal 600 based on information associated with the precoding vector, and may transmit the data to the base station 660 using the identified precoding vector.

The transmitter 650 may transmit, to the base station 660, channel quality information associated with the precoding vector selected by the precoding vector selector 630. When the terminals 600 and 670 select the same column vector as the precoding vector, the base station 660 may select any one of the terminals 600 and 670 as a terminal to receive data based on the channel quality information. The base station 660 may transmit the data to the selected terminal.

When the terminal 600 selects, as the precoding vector, a first column vector included in a precoding matrix to receive first data from the base station 660, and the terminal 670 selects, as the precoding vector, a second column vector included in the precoding matrix to receive second data from the base station 660, the channel quality information may be, for example, information associated with an SNR between the terminal 600 and the base station 660.

In this case, the channel quality information generator 640 may generate, as second channel quality information, information associated with an SNR in a case where the terminal 670 does not receive the second data. The transmitter 650 may transmit the second channel quality information to the base station 660.

The base station 660 may compare an SNR in a case where the terminal 670 receives the second data with an SNR in a case where the terminal 670 does not receive the second data to thereby select a terminal to receive the data.

When the terminal 600 selects, as the precoding vector, the first column vector included in the precoding matrix to receive the first data from the base station 660, and the terminal 670 does not receive the first data from the base station 660 using another precoding vector included in the precoding matrix, the channel quality information generator 640 may generate, as the channel quality information, information associated with the SNR between the terminal 600 and the base station 660.

In this case, when the terminal 670 selects, as the precoding vector, the second column vector included in the precoding matrix to receive the second data from the base station 660, the channel quality information generator 640 may generate, as the second channel quality information, information associated with the SNR the between the terminal 600 and the base station 660.

The transmitter 650 may transmit, to the base station 660, the channel quality information and the second channel quality information. The base station 660 may compare an SNR in a case where the terminal 670 receives the second data with an SNR in a case where the terminal 670 does not receive the data, to thereby select a terminal to receive the data.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A terminal comprising:
a channel estimator to estimate a channel status of a channel formed between the terminal and a base station;
a precoding vector selector to select a precoding vector from column vectors included in a precoding matrix based on the channel status;
a feedback information generator; and
a transmitter,
wherein, when the precoding vector selector selects consecutive column vectors as precoding vectors, the feedback information generator selects, as a reference vector, a column vector that is located at an outermost location among the precoding vectors and generates, as feedback information, information associated with the reference vector and a number of the selected column vectors, and the transmitter transmits the feedback information to the base station.

2. The terminal of claim 1, further comprising:
a receiver to receive a pilot signal from the base station, wherein the channel estimator estimates the channel status based on the pilot signal.

3. The terminal of claim 1, wherein information associated with the reference vector includes information associated with an index of the reference vector and information associated with a location of the reference vector among the consecutive column vectors.

4. The terminal of claim 1, further comprising:
a channel quality information generator to generate channel quality information associated with the channel formed between the terminal and the base station, based on the precoding vectors,
wherein the feedback information generator includes the channel quality information in the feedback information.

5. The terminal of claim 1, further comprising:
a receiver to receive data from the base station based on the feedback information.

6. A base station comprising:
a receiver to receive feedback information from each of terminals included in the base station;
a precoding vector identifier to identify a precoding vector selected by each of the terminals, based on the feedback information;
a terminal selector to select, as a data reception terminal, terminals where the selected precoding vectors do not overlap; and
a transmitter to transmit data to the data receive terminal,
wherein the receiver receives, from each of the terminals, channel quality information associated with the precoding vector, and the terminal selector selects the data receive terminals based on the channel quality information,
wherein the terminal selector selects, from the terminals where the selected precoding vectors do not overlap, a terminal having relatively excellent channel quality information as the data receive terminal.

7. A base station comprising:
a receiver to receive feedback information from each of terminals included in the base station;
a precoding vector identifier to identify a precoding vector selected by each of the terminals, based on the feedback information;
a terminal selector to select, as a data reception terminal, terminals where the selected precoding vectors do not overlap; and
a transmitter to transmit data to the data receive terminal, wherein:
the precoding vectors are consecutive column vectors included in a precoding matrix, and
the feedback information includes information associated with a reference vector corresponding to an outermost vector among the precoding vectors, and a number of the column vectors.

8. The base station of claim 7, wherein information associated with the reference vector includes information associated with an index of the reference vector and information associated with a location of the reference vector among the consecutive column vectors.

9. A terminal comprising:
a channel estimator to estimate a channel status of a channel formed between the terminal and a base station;
a precoding vector selector to select, from column vectors included in a precoding matrix, at least one consecutive column vector including a first column vector or a last column vector as a precoding vector, based on the channel status;
a transmitter to transmit information associated with the precoding vector to the base station; and
a receiver to receive data from the base station based on the precoding vector.

10. The terminal of claim 9, further comprising:
a channel quality information generator to generate channel quality information associated with the precoding vector, wherein the transmitter transmits the channel quality information to the base station.

11. The terminal of claim 10, wherein, when the terminal receives first data from the base station based on the precoding vector, and a second terminal receives second data from the base station based on other column vector unselected as the precoding vector from the column vectors included in the precoding matrix, the channel quality information generator generates, as the channel quality information, information associated with a signal-to-noise (SNR) ratio between the base station and the terminal.

12. The terminal of claim 11, wherein the channel quality information generator additionally generates, as second channel quality information, information associated with an SNR in a case where the second terminal does not receive the second data.

13. The terminal of claim 10, wherein, when the terminal receives first data from the base station based on the precoding vector, and other column vectors unselected as the precoding vector from the column vectors included in the precoding matrix are not used by the base station, the channel quality information generator generates, as the channel quality information, information associated with an SNR between the base station and the terminal.

14. The terminal of claim 13, wherein, when a second terminal receives second data from the base station based on the other column vectors unselected as the precoding vector from the column vectors included in the precoding matrix, the channel quality information generator generates, as second channel quality information, information associated with an SNR between the base station and the terminal.

* * * * *